(12) United States Patent
Luo et al.

(10) Patent No.: US 12,234,711 B2
(45) Date of Patent: Feb. 25, 2025

(54) HARD PIPE CONNECTING DEVICE AND MANIFOLD SYSTEM THEREOF

(71) Applicant: Sichuan Honghua Petroleum Equipment Co., Ltd., Guanghan (CN)

(72) Inventors: Quan Luo, Guanghan (CN); Ru Miao, Guanghan (CN); Maolin Zhu, Guanghan (CN); Meiying Xie, Guanghan (CN); Jiaping Yang, Guanghan (CN)

(73) Assignee: Sichuan Honghua Petroleum Equipment Co., Ltd., Sichuan (CN)

( * ) Notice: Subject to any disclaimer, the term of this patent is extended or adjusted under 35 U.S.C. 154(b) by 320 days.

(21) Appl. No.: 17/929,094

(22) Filed: Sep. 1, 2022

(65) Prior Publication Data

US 2023/0082967 A1    Mar. 16, 2023

(30) Foreign Application Priority Data

Sep. 10, 2021  (CN) .......................... 202111064542.1
Sep. 10, 2021  (CN) .......................... 202122201553.1

(51) Int. Cl.
*F16L 23/12* (2006.01)
*E21B 33/068* (2006.01)
*E21B 43/26* (2006.01)
*F16L 23/18* (2006.01)

(52) U.S. Cl.
CPC ........ *E21B 43/2607* (2020.05); *E21B 33/068* (2013.01); *F16L 23/12* (2013.01); *F16L 23/18* (2013.01)

(58) Field of Classification Search
CPC . F16L 23/12; F16L 23/18; F16L 23/16; F16L 23/162; F16L 23/20; F16L 23/22; F16L 27/08; F16L 27/0824; F16L 27/0828; F16L 27/0841; F16L 27/0849; F16L 27/0853; F16L 27/1012; F16L 37/103; F16L 37/242; F16L 23/02; E21B 33/068
USPC .................................... 285/148.27, 276, 278
See application file for complete search history.

(56) References Cited

U.S. PATENT DOCUMENTS

| | | | | |
|---|---|---|---|---|
| 2,846,013 A | * | 8/1958 | Davis ...................... | E21B 33/03 166/94.1 |
| 9,694,732 B2 | * | 7/2017 | Blanchard ............... | B60P 3/225 |

* cited by examiner

*Primary Examiner* — Aaron M Dunwoody
(74) *Attorney, Agent, or Firm* — Andrew D. Fortney; Central California IP Group, P.C.

(57) ABSTRACT

A hard pipe connecting device and manifold system are disclosed that solve technical problems of existing fracturing pipelines, such as poor safety performance, too many connecting parts, inconvenient and ineffective connection between the parts, complicated installation structure, and difficulty to adjust the distance and the angle. In order to solve the technical problems, the hard pipe connecting device includes at least one non-concentric connecting pipe joint, which includes a pipe body and first flanges at opposite ends of the pipe body. The two first flanges are parallel to each other with a distance difference h, where h>0.

20 Claims, 11 Drawing Sheets

FIG. 14

HARD PIPE CONNECTING DEVICE AND MANIFOLD SYSTEM THEREOF

RELATED APPLICATIONS

The present application claims priority to Chinese Pat. Appl. Nos. 202111064542.1 and 202122201553.1, each filed on Sep. 10, 2021, both of which are incorporated herein by reference in their entireties.

TECHNICAL FIELD

The invention relates to the technical field of oil and gas drilling equipment, in particular to a hard pipe connecting device and a manifold system thereof.

BACKGROUND OF THE INVENTION

In the field of oil, natural gas and other underground resource extraction, in order to facilitate the extraction of oil, natural gas and other underground resources, it is often necessary to use a drilling and extraction system to extract the resources. A fracturing process that creates one or more artificial fractures in a rock formation, such fracturing generally involves injecting a fracturing fluid, often a mixture of sand and water, into a well to increase the pressure of the well and create artificial fractures, The fracturing fluid is generally transported to one or more wellheads through the fracturing pipeline through the fracturing manifold. However, the fracturing pipeline connection between the fracturing manifold and the wellhead, the fracturing pump and the fracturing manifold is usually bulky and cumbersome. This makes it very difficult to adjust the connection between the fracturing manifold and the wellhead.

At present, the fracturing pipeline of the ground part of the domestic fracturing site generally adopts a high-pressure union pipeline, the high-pressure union pipeline consists of a plurality of unions and a plurality of elbows, and adopts a structural form of union threaded connection and flange rigid connection, and the prior art mainly has the following defects:

1. hammering and beating are needed during installation, so that the thread is easy to damage and break, and the safety performance is poor;
2. due to the difference between the installation directions of the surfaces to be connected and the actual distances between wells, between the well heads and the fracturing manifolds, and/or between the fracturing pumps and the fracturing manifolds, the length of the fracturing pipeline and the installation directions of the connection surfaces at two ends of the fracturing pipeline cannot be accurately preset, so that the fracturing pipelines cannot be uniformly prepared and need to be adjusted on site;
3. Adopting rigid connection, when a distance or a position need be adjusted, general method is through increasing angle joint and straight tube, turning the pipeline 90° at least twice. The operation is very complicated, time and energy consuming and low efficient. And more as the direction of the fluid is changed multiple times, it brings very big inconvenience for equipment installation and fluid smooth transportation.

Therefore, there is a need for a solution to the above problems.

SUMMARY OF THE INVENTION

The invention aims to: disclose a hard pipe connecting device and manifold system thereof to solve the technical problems of the existing fracturing pipeline, such as the poor safety performance, too many connecting parts, the inconvenient and ineffective connection between the parts, complicated installation structure, and difficulty to adjust the distance and the angle.

In order to achieve the purpose, the invention adopts the technical scheme that: A hard pipe connecting device comprises at least one non-concentric connecting pipe joint, which includes a pipe body and first flanges at both ends of the pipe body. The two first flanges are parallel to each other with a distance difference h (h>0).

The hard pipe connecting device comprises non-concentric connecting pipe joints, which are rotated along an end face of the first flange at one end, to change the position of the end face of the first flange at the other end in a plane, so that the hard pipe connecting device can make a smooth connection of to-be-connected surfaces with various radial distance differences in space. According to actual conditions, with a butt-joint combination of different numbers and different installation structures of a plurality of non-concentric connecting pipe joints, the hard pipe connecting device can adapt to the smooth connection of to-be-connected surfaces with various radial distance differences in space, with rather wide application ranges and scenes.

Specifically, a non-concentric connecting pipe joint is equivalent to a vector which can rotate randomly with a size e, and the two non-concentric connecting pipe joints are overlapped to get a vector synthesis. When the two non-concentric connecting pipe joints are in butt joint connection, the final track coverage range of the first flange at the two ends of the device is a full circle with a radius of 2e, the maximum adjustment range can reach twice the height difference of the relative positions of the circle centers of the first flange at the two ends of the device. As the adjustment range is wider, a wider connection range of the hard pipe connecting device can be adjusted without influencing the liquid flow, and with less connecting parts such as elbows and the like for flow channel steering, and a smoother liquid flow.

As a preferable scheme of the invention, the device further comprises at least one universal connecting pipe joint, wherein the universal connecting pipe joint comprises a pipe joint main body and second flanges at two ends of the pipe joint main body, the planes of the end surfaces of the two second flange form an included angle M (M<90°), and the non-concentric connecting pipe joint is in butt joint communication with the universal connecting pipe joint or is in pipeline communication with the universal connecting pipe joint. The universal connecting pipe joint can rotate at one end on one terminal surface of the second flange, wherein the orientation of the second flange at the other end changes in the space, which makes the hard pipe connecting device can handle poor position orientation in space into a smooth connection. According to actual conditions, a plurality of non-concentric connecting pipe joints and universal connecting pipe joints can be used to the butt joint combination with different connecting structure, which makes the hard pipe connecting device can adapt to smooth connection of the surfaces with different orientations in space, and/or with different radial distance.

In a preferred embodiment of the present invention, an end surface of one of the second flanges of the universal joint is perpendicular to an axis of the joint main body. A second flange of universal connection joint is sloped relative to the joint main body, another second flange is perpendicular to the joint main body. When the two universal connection joints are butt joint to the sloped second flanges, it can not only change the space orientation of both ends of the flanges through relative rotation of the adjacent universal connection joints, but also can rotate to making both ends of the flanges parallel to each other, wherein it makes the hard pipe connecting device adapt to smooth connection of to-be-connected surfaces with/without positional deviation.

As a preferable embodiment of the present invention, a rotary seal is configured between the first flange and the pipe body, and/or a rotary seal is configured between the second flange and the pipe joint main body. The rotary seal makes the first flange rotate relative to the body, and the second flange rotate relatively to the pipe joint main body; makes the first flange and the second flange adapt to the position of holes on the surfaces to be connected, and further facilitates the smooth connection of the surfaces to be connected.

As a preferable embodiment of the present invention, the rotary seal comprises a supplementary core and a plurality of steel balls, the steel balls are at the rear side of the force-bearing end surface of the supplementary core. An installation groove adapted to the steel balls is configured on the pipe body and/or the pipe joint main body, the supplementary core includes a bending section, a notch adapted to the bending section is configured on the pipe body and/or the pipe joint main body, and the bending section extends into the notch. The steel balls are used for assisting relative rotation between the flange and the pipe body, the supplementary core is used for preventing external environment impurities from influencing smooth rotation of the steel balls, meanwhile, a force bearing end surface of the supplementary core is a butt joint surface of the flange. When the flange is stressed, the force is transmitted to the pipe body through the supplementary core, so that the seal of the two flanges in butt joint connection can maintain stable with good sealing effect, and reducing vibration effect.

As a preferable embodiment of the invention, the supplementary core is detachably connected to the pipe body through a screw, and a plurality of steel balls are configured around the axis of the pipe body. The structure with separating the supplementary core and the pipe body, makes it possible for the flange to be installed from the end surface of the pipe body after the supplementary core is installed, so as to facilitate the installation of the flanges.

As a preferable embodiment of the present invention, the first flange and/or the second flange comprise(s) with a mounting hole for the steel balls. The mounting hole is connected to a mounting groove, and a limiting part are configured in the mounting hole, so as to facilitate the steel balls easily install from the mounting hole into the mounting groove. The steel balls pass from the mounting hole and install to the mounting groove, then the mounting hole will be blocked by the limiting part, and the steel balls' position is limited by the mounting groove, which makes the relative positions of the flange and the pipe body along the axis direction fixed.

As a preferable embodiment of the present invention, the pipe body, the pipe joint main body, the first flange, and the second flange are respectively configured with at least one tool hole. In some other embodiments, the outer wall of the pipe body is configured with a rib, and at least one tool hole is configured on the rib. The flange and the pipe body can be rotated relatively through a rod tool, and the axis distance difference of the two end surfaces of the non-concentric connecting pipe joints can be adjusted conveniently.

As a preferable embodiment of the present invention, two or more pipe joints are sequentially connected in a butt joint manner to form a split-joint surface. With the multiple pipe joints connected in a butt joint mode, the range of adaptable connection of the two end surfaces of the non-concentric connecting pipe joint is enlarged, the position of the surface to be connected can be adjusted by relatively rotating the two adjacent pipe joints, and the position is adapted to the actual position deviation between the surfaces to be connected.

In other embodiments, the pipe body is an angle pipe and/or a straight pipe.

As a preferred embodiment of the present invention, seal grooves are respectively configured on end surfaces of the first flange and the second flange, and the seal grooves are configured to enclose a seal ring.

In a preferred embodiment of the present invention, the hard pipe connecting device further comprises at least one angle pipe joint and/or at least one straight pipe joint. The angle pipe joint is used to change 90-degree steering of liquid in the hard pipe connecting device, conveniently enabling the hard pipe connecting device adapt to actual positions of joints to be connected. And the straight pipe joint is used to adjust the total length of the hard pipe connecting device, reducing the pipe joint quantity. Either the angle pipe joint or the straight pipe joint can be configured between the non-concentric connecting pipe joint and the universal connecting pipe joint, so that the non-concentric connecting pipe joint and the universal connecting pipe joint connect with each other through the angle pipe joint or the straight pipe joint.

As a preferable embodiment of the present invention, the straight pipe joint comprises a straight pipe and a third flange at both ends of the straight pipe, and a rotary seal is configured between the third flange and the straight pipe. So that the straight pipe joint can be adapted to the position of the connecting hole of the pipe to be connected.

A manifold system comprises at least one fracturing tree and at least one shunt manifold skid, wherein each fracturing tree is communicated with the shunt manifold skids through at least one hard pipe connecting device, and the shunt manifold skids are communicated with each other through the hard pipe connecting devices.

The manifold system of present invention, wherein the manifold skid and the wellhead fracturing tree, and the adjacent manifold skids are connected through the hard pipe connecting device, in which the fracturing tree and the manifold skid and the two adjacent manifold skids can be conveniently, quickly, stably and reliably connected through a small number of pipe joints, meanwhile, the stable connection between the fracturing tree and the manifold skid and between the manifold skids is not affected by the deviation of the placing position, and the adaptability of the manifold system to the environment is further improved.

In another embodiment, the manifold system comprises at least one fracturing device and at least one high-low pressure manifold skid, wherein the fracturing device is communicated with the high-low pressure manifold skid through at least one hard pipe connecting device.

According to the manifold system, the fracturing equipment and the high-low pressure manifold skid are connected through the hard pipe connecting device, so that the fracturing equipment and the high-low pressure manifold skid can be conveniently, quickly, stably and reliably connected through a small number of pipe joints, meanwhile, the stable connection between the fracturing equipment and the high-low pressure manifold skid is not affected by the deviation of the placing position, and the adaptability of the manifold system to the environment is improved.

A manifold system comprises a fracturing tree, a shunt manifold skid, fracturing equipment and a high-low pressure manifold skid, wherein the fracturing tree is connected to the shunt manifold skid through the hard pipe connecting device; the adjacent shunt manifold skids are communicated through the hard pipe connecting device; the fracturing equipment is connected to the high-low pressure manifold skid through the hard pipe connecting device, and the shunt manifold skid is communicated with the high-low pressure manifold skid through the hard pipe connecting device.

The manifold system, comprising a plurality of fracturing trees, the shunt manifold skid, the fracturing equipment and the high-low pressure manifold skid, can be directly applied to the fracturing manifold system for the exploitation of petroleum, natural gas and other underground resources, which is convenient to connect all equipment, easy to adjust, and easily adapted to the complex terrain environment of a fracturing site.

In summary, due to the adoption of the technical scheme, the hard pipe connecting device has the beneficial effects as:
1. The direction angle of the end surface of the universal connecting pipe joint can be adjusted by rotating the universal connecting pipe joint along the split-joint plane; the direction angle of the end surface of the first flange at the other end of the pipe body can be adjusted by rotating one end of the non-concentric connecting pipe joint along the end surface of the first flange, and the direction of the connecting surfaces at the two ends of the hard pipe connecting device can be adjusted by respectively adjusting the two pipe joints;
2. In some embodiments, the two pipe joints are matched, so that the adjustable range of the connecting surfaces at the two ends of the hard pipe connecting device is wider, and the hard pipe connecting device can be conveniently, quickly and effectively connected with a part to be connected;
3. In some other embodiments, the pipe joints are simple in connection structure, and the distance and the direction between the pipe joints and the parts to be connected can be adjusted easily by adjusting the number and the connection structure of the pipe joints.
4. In some embodiments, the first flange and the second flange are configured in a non-coaxial structural form, so that when the pipe joint is integrally rotated along the end surface of one side, the position of the end surface of the other side can be correspondingly changed, thereof the end surface of the other side can be adapted to a surface to be connected. The simple structure can connect the to-be-connected surfaces when the circle center connecting line and the pipeline axis are not on the same straight line with the axis deviation.

Reference numerals: 1—non-concentric connecting pipe joint, 11—pipe body, 12—first flange, 2—universal connecting pipe joint, 21—pipe joint main body, 22—second flange, 3—rotary seal, 31—supplementary core, 311—bending section, 32—steel ball, 4—mounting groove, 5—notch, 6—mounting hole, 7—limiting part, 8—tool hole, 9—sealing groove, 10—sealing ring, 20—angle pipe joint, 30—straight pipe joint, 301—straight pipe, 302—third flange, 40—hard pipe connecting device, 50—fracturing tree, 60—shunt manifold skid, 70—fracturing device and 80—high-low pressure manifold skid.

EXAMPLES

The present invention will be described in detail below with reference to the accompanying drawings.

In order to make the objects, technical solutions and advantages of the present invention more apparent, the present invention is described in further detail below with reference to the accompanying drawings and embodiments. It should be understood that the specific embodiments described herein are merely illustrative of the invention and are not intended to limit the invention.

Example 1

As shown in FIGS. 1 to 5, a hard pipe connecting device comprises at least one non-concentric connecting pipe joint 1, wherein the non-concentric connecting pipe joint 1 comprises a pipe body 11 and first flanges 12 at two ends of the pipe body 11, the two first flanges 12 are parallel to each other, and the axes of the two first flanges 12 have a distance difference h, wherein h is greater than 0. In some embodiments, the pipe body 11 can choose a straight pipe or an angle pipe according to the needs of the site. The first flanges 12 at both ends of the angled pipe are parallel to each other, and the two are not concentric.

Figure 1:
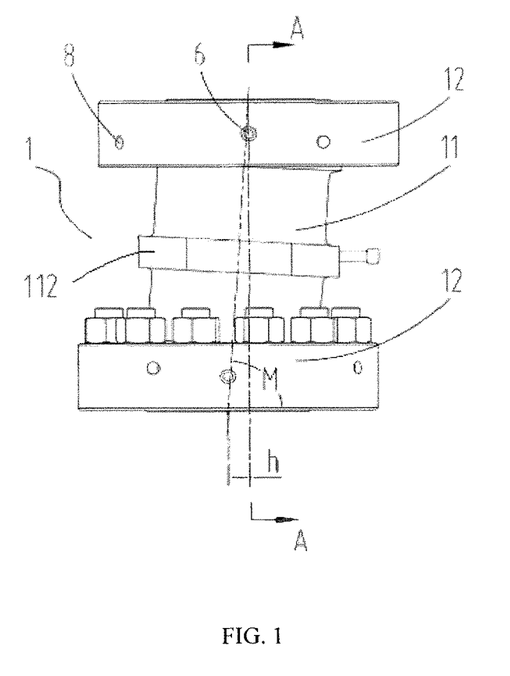
FIG. 1 is a schematic diagram of a non-concentric pipe joint in Embodiment 1.

The hard pipe connecting device in the embodiment, as shown in FIG. 1, wherein the end surface circle centers of the first flanges 12 at the two ends of the non-concentric connecting pipe joint 1 are not on the same straight line, there is a height difference h of a relative position, one non-concentric connecting pipe joint 1 is equivalent to a vector which can rotate at will and has a size of e, when the non-concentric connecting pipe joint 1 rotates along the end surface axis of the first flange 12 at one side, the track coverage area of the first flange 12 at the other side is a full circle with a radius of e, so that the position adjustment of the first flange 12 at the other side can be done, the non-concentric connecting pipe joint 1 can adjust the position of the first flanges 12 at the two ends in the track coverage area, and the quick and stable connection of the to-be-connected surfaces which are parallel to each other but have a spatial height difference can be accomplished.

Figure 3:
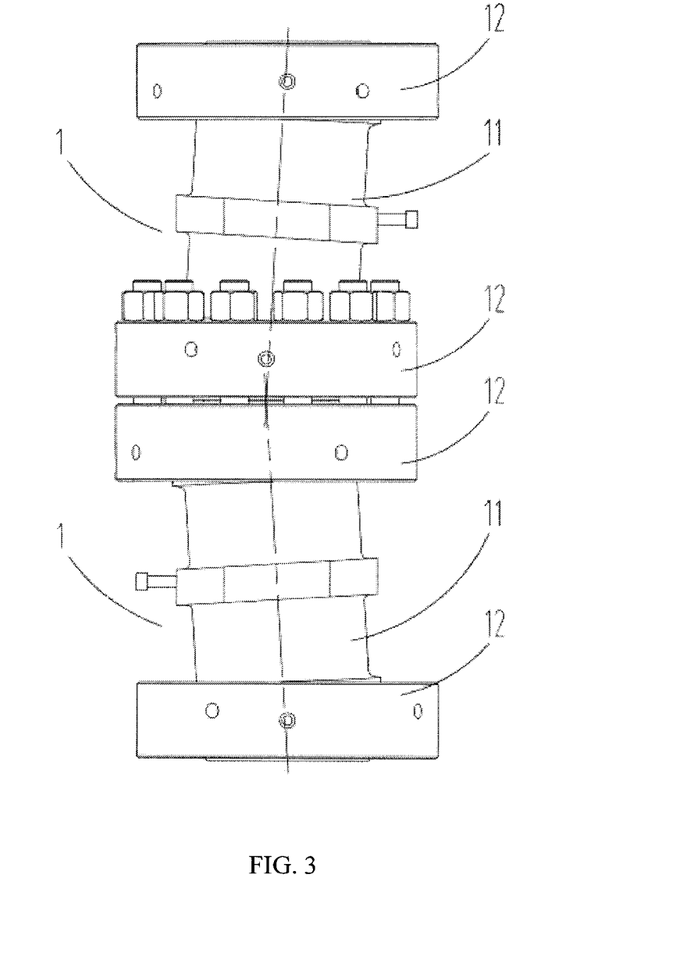
FIG. 3 is a schematic structural diagram of a hard pipe connecting device combining two non-concentric connecting pipe joints in Embodiment 1.

Specifically, as shown in FIG. 3, in the present embodiment, two non-concentric connecting pipe joints 1 with same shape and structure are connected in a butt joint manner, the first flanges 12 at the two ends of the non-concentric connecting pipe joints 1 are parallel to each other, a sealing ring 10 made of a metal material is embedded in the butt joint surface of the two non-concentric connecting pipe joints 1 through a sealing groove 9 for sealing, the two non-concentric connecting pipe joints 1 can rotate along the butt joint surface to adjust the end surface positions of the first flanges 12 at the two ends, and are stably connected through conventional fasteners such as bolts and nuts, and the two non-concentric connecting pipe joints 1 are stacked to obtain a full circle track coverage range with a radius 2 e, that is, a single non-concentric connecting pipe joint 1 can at least achieve effective sealing connection of two to-be-connected surfaces within a range with a height difference 2 h, and two non-concentric connecting pipe joints 2 having the same specification and size are stacked, the effective sealing connection of two sides of the space with the height difference of 4 h can be accomplished at least, and the application range of the hard pipe connecting device to the space height difference of the surface to be connected is expanded.

Specifically, according to actual conditions, the non-concentric connecting pipe joints 1 with various relative position height differences of the end face circle center are adopted for butt joint, the adjusting range is changed, the spatial connectable range of the hard pipe connecting device is further increased, and redundant switching pipelines between the to-be-connected surfaces with end face horizontal or vertical position differences are simplified.

Specifically, adjusting the number of the non-concentric connecting pipe joints 1 according to actual conditions can change the connectable range of the end surface of the hard pipe connecting device and the length of the hard pipe connecting device, which accomplish a stable connection between the parts to be connected through a small number of pipe joints, keep the pipe diameter of the hard pipe connecting device in a large flow state by the flange connection mode, and make it possible to adjust the hard pipe connecting device in a wide range without influencing the liquid flow.

Figure 2:
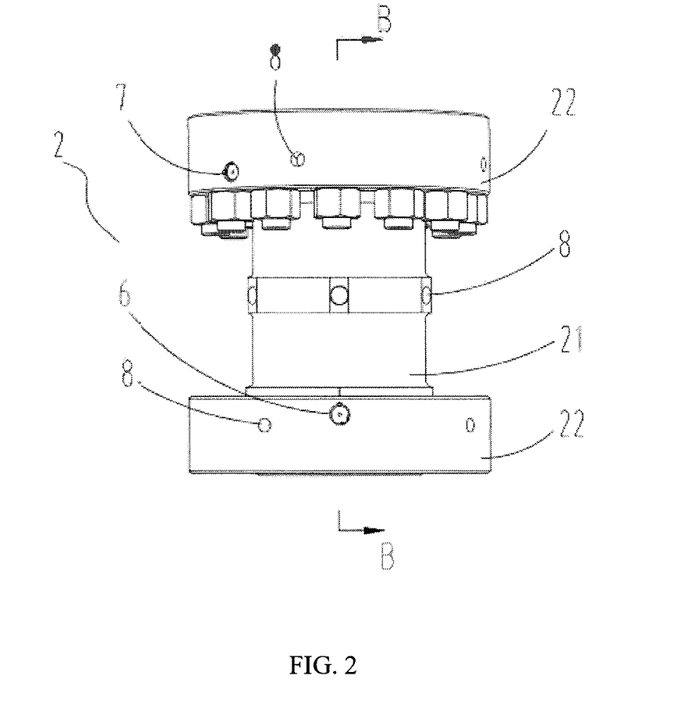
FIG. 2 is a schematic structural view of the universal joint pipe joint described in Embodiment 1.

Preferably, the hard pipe connecting device of the embodiment further comprises at least one universal connecting pipe joint 2, which comprises a pipe joint main body 21 and second flanges 22 at two ends of the pipe joint main body 21, and the planes where end surfaces of the second flanges 21 are located can form an included angle M, where M is less than 90°.

Specifically, as shown in FIG. 2, an end surface of one of the second flanges 22 of the universal connecting pipe joint 2 is perpendicular to an axis of the pipe joint body 21, and an end surface of the other second flange 22 is inclined with an included angle smaller than 90° with respect to the pipe joint main body 21, so that when the universal joint rotates along the end surface of one of the second flanges 22, a spatial orientation of the other second flange 22 changes, and the hard pipe connecting device is adapted to smooth connection to a to-be-connected surface with a poor orientation.

Figure 4:
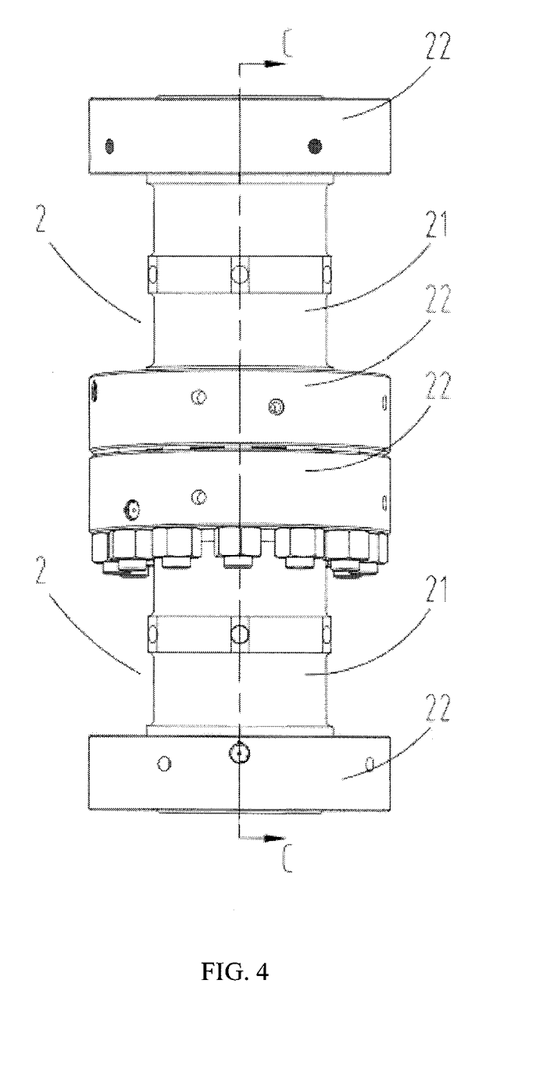
FIG. 4 is a schematic structural diagram of a hard pipe connecting device combined by two universal pipe joints in Embodiment 1.

Specifically, as shown in FIG. 4, a hard pipe connecting device of the embodiment adopts two universal connecting pipe joints 2 to connect in a butt joint manner: the two universal connecting joints 2 connect in a butt joint manner through the second flange 22 sloped to the pipe joint main body 21. A sealing ring 10 made of metal material is embedded in a seal groove 9 to seal the butt joint surface of two universal connecting pipe joints 2. Rotating relatively the two universal connecting pipe joints 2 can change the orientation of both end surfaces in the space, rotate along the butt joint surface to the state that makes both end surfaces parallel to each other, and make the hard tube connecting device adapt to the smooth connection to the surfaces with/without a positional deviation.

Figure 5:
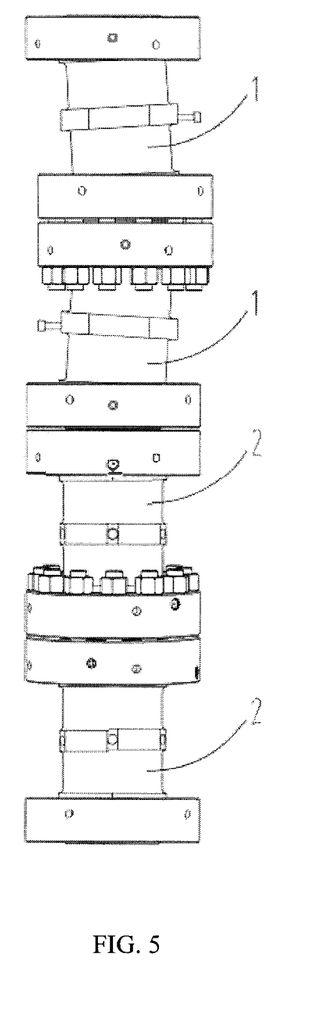
FIG. 5 is a schematic structural diagram of a hard pipe connecting device combining a universal joint and a non-concentric joint in Embodiment 1.

Specifically, as shown in FIG. 5, the hard pipe connecting device of the embodiment connects a non-concentric connecting pipe joint 1 and a universal connecting pipe joint 2 in a butt joint manner, so that the hard pipe connecting device can be simultaneously adapted to smooth connection of to-be-connected surfaces with different orientations and various radial distance differences in space.

Specifically, according to actual conditions, it is adjustable for the number of the non-concentric connecting pipe joints 1 and the universal connecting pipe joints 2 and the installation structure of the butt joint combination, the axial distance difference of the first flanges 12 at the two ends of the non-concentric connecting pipe joints 1, and the included angle value of the two end surfaces of the universal connecting pipe joints 2, which makes the application range of the hard pipe connecting device further expanded, and adapted to more application scenes.

Specifically, the first flange 12 and the second flange 22 may be flanges with through holes or blind holes, and both flanges can be connected and fixed by bolts and nuts.

Example 2

Figure 6:
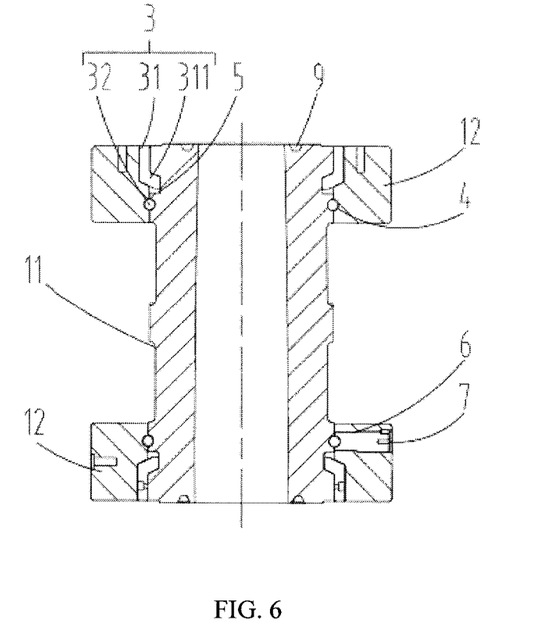
FIG. 6 is a schematic sectional view along line A-A of the non-concentric coupling pipe joint of Embodiment 2 in FIG. 1.

As shown in FIG. 6, a hard pipe connecting device of the present embodiment has the same structure as that of embodiment 1, except that: a rotary seal 3 is between the first flange 12 and the pipe body 11. The rotary seal 3 comprises a supplementary core 31 and a plurality of steel balls 32. The steel balls 32 are on a rear side of a bearing end face of the supplementary core 31, and the steel balls 32 are uniformly configured around the pipe body 11.

Specifically, the supplementary core 31 is in the ring shape, sleeved on the end of the pipe body 11. A notch 5 is on the outer wall of the pipe body, the supplementary core 31 is configured with a bending section 311 extending into the notch 5, the supplementary core 31 and the pipe body 11 are connected through a screw along the radial orientation of the pipe body 1. The bending section 311 of the supplementary core 31 is close to the steel balls 32. A plurality of steel balls 32 is configured to evenly surround the pipe body 11, which makes the first flange 12 can rotate smoothly around its own axis. Changing the position of the connecting holes on the first flange 12 will make the first flange 12 more smoothly being connected to the to-be-connected surface.

Preferably, the pipe body 11 is configured with a mounting groove 4 adapted to the steel balls 32, the first flange 12 is configured with mounting holes 6 for mounting the steel balls 32, and the mounting holes 6 are communicated with the mounting groove 4, and the mounting holes 6 are internally configured with a limiting part 7.

Specifically, the mounting groove 4 is a ring groove around the pipe body 11 or a hemisphere groove adapting to the shape of the steel balls 32. The mounting groove 4 is formed by buckling two parts, and the two parts of mounting groove 4 can be selective a ring groove or a hemisphere groove.

Specifically, the limiting part 7 comprises a plug and a clamp spring which are embedded into the mounting hole 6.

Example 3

As shown in FIGS. 6 to 9, the hard pipe connecting device of the present embodiment has the same structure as that of embodiment 1, except that: a rotary seal 3 is configured between the second flange 22 and the pipe joint main body 21. The rotary seal 3 comprises a supplementary core 31 and a plurality of steel balls 32. The steel balls 32 are at the rear side of the bearing end surface of the supplementary core 31, and the steel balls 32 are uniformly configured around the pipe joint main body 21.

Figure 7:
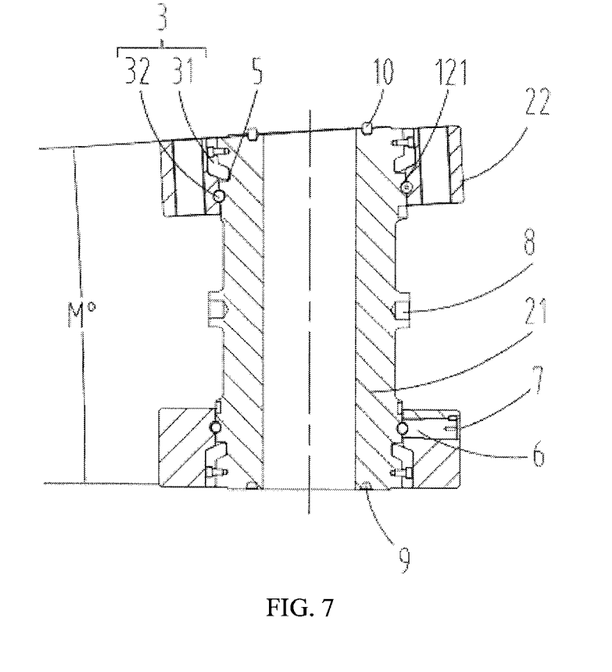
FIG. 7 is a schematic sectional view along line B-B of the universal pipe joint in Embodiment 3 in FIG. 2.
Figure 8:
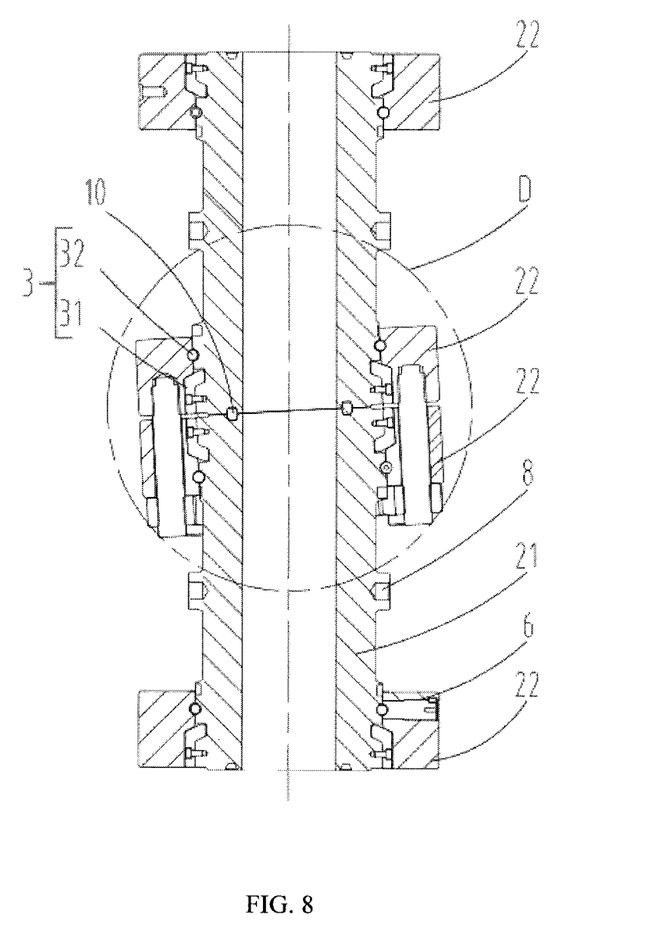
FIG. 8 is a schematic sectional view of the hard pipe connecting device along line C-C of the two universal pipe joints combinations in Embodiment 3 in FIG. 4.
Figure 9:
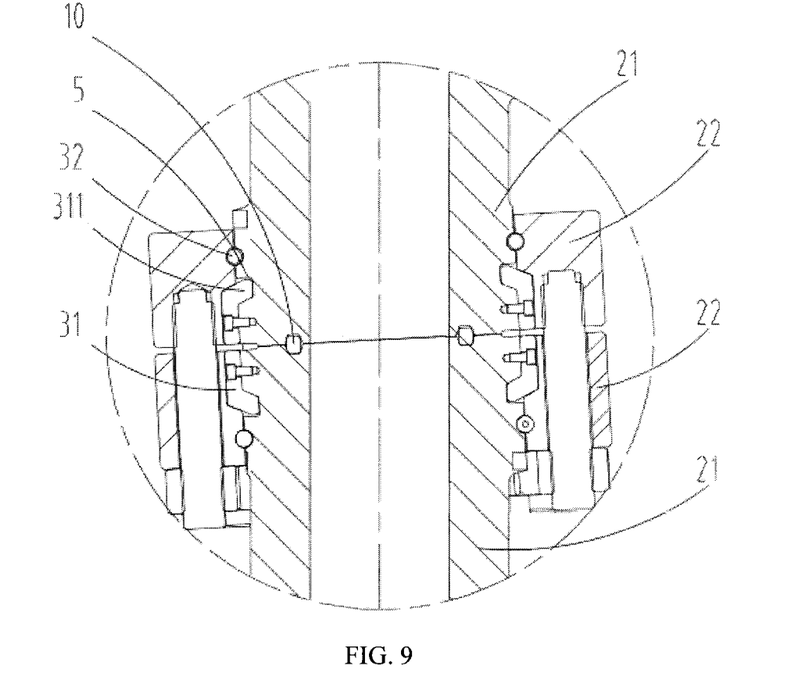
FIG. 9 is a partial enlarged view at D in FIG. 8.

Preferably, the pipe joint main body 21 is configured with a mounting groove 4 adapted to the steel balls 32. The second flange 22 is configured with a mounting hole 6 for mounting the steel balls 32, the mounting hole 6 is communicated with the mounting groove 4, and the mounting hole 6 is internally configured with a limiting part 7.

Specifically, the mounting groove 4 is a ring groove sleeved around the pipe joint body 21 or a hemispherical groove matched with the shape of the steel balls 32. The mounting groove 4 is formed by buckling two parts, and the two parts can be selectively a ring groove or a hemispherical groove.

Specifically, the limiting part 7 comprises a plug and a clamp spring which are embedded into the mounting hole 6.

Preferably, at least one tool hole 8 is configured respectively on the first flange 12, the second flange 33, the pipe body 11 and the pipe joint main part 21. The tool hole 8 can adapt to a connection tool to extend the arm of force, so as to rapid rotate the first flange 12 and the second flange 22, and make the mounting holes on first flange 12 and the second flange 22 align with the connection hole on the to-be-connected surface. Preferably, the outer wall of the pipe body 11 is configured with a rib 112 to increase the overall strength of the pipe body 11 and ensure the structural stability of the pipe body 11 during the adjustment of the axial distance difference, and at least one of the first tool holes 3 is on the rib 112.

Specifically, the second flange 22 is installed obliquely by a thickened step on the outer wall of the pipe joint main body 21.

Example 4

Figure 10:
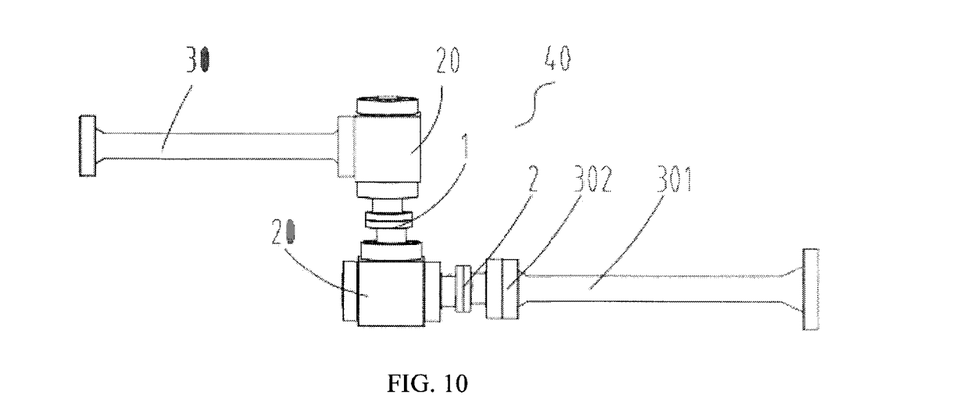
FIG. 10 is a schematic structural view of a hard pipe connecting device according to Embodiment 4.

As shown in FIG. 10, the hard pipe connecting device of the present embodiment has the same structure as that of embodiment 3, except that: the connecting device further comprises at least one angle through pipe joint 20 and at least one straight pipe joint 30, wherein the angle through pipe joint 20 is preferably a flange-connected 90-degree angle through pipe joint 20, the straight pipe joint 30 is preferably a flange-connected straight pipe joint 30, which make the connectable range of the hard pipe connecting device further increased, and make the adaptation of the distance, the height and the orientation of the connecting surface between the hard pipe connecting device and a to-be-connected part.

Specifically, the number of the universal connecting pipe joints 2 and the non-concentric connecting pipe joints 1, the installation structure along the hard pipe connecting device, and the installation position and the number of the straight pipe joints 30 or the angle through pipe joints 20 can be adjusted according to actual conditions, so that the further adjustment of the adjustable range of the hard pipe connecting device is accomplished.

Preferably, the straight pipe joint 30 comprises a straight pipe 301 and third flanges 302 at two ends of the straight pipe 301, and a rotary seal 3 is configured between the third flange 302 and the straight pipe 301.

Specifically, the hard pipe connecting device of the embodiment can be suitable for the petroleum drilling industry in the situations related to complex fluid pipeline transmission, such as fracturing fluid transmission, flow splitting, flow converging, slurry transmission and the like, and can be particularly suitable for fast and stable connection between two to-be-connected surfaces with spatial end surface radial distance difference, axial distance difference and spatial orientation angle difference, and can reduce vibration of a manifold system and improve stability of complex fluid high-pressure transmission through cooperation between the pipe joints.

Example 5

Figure 11:
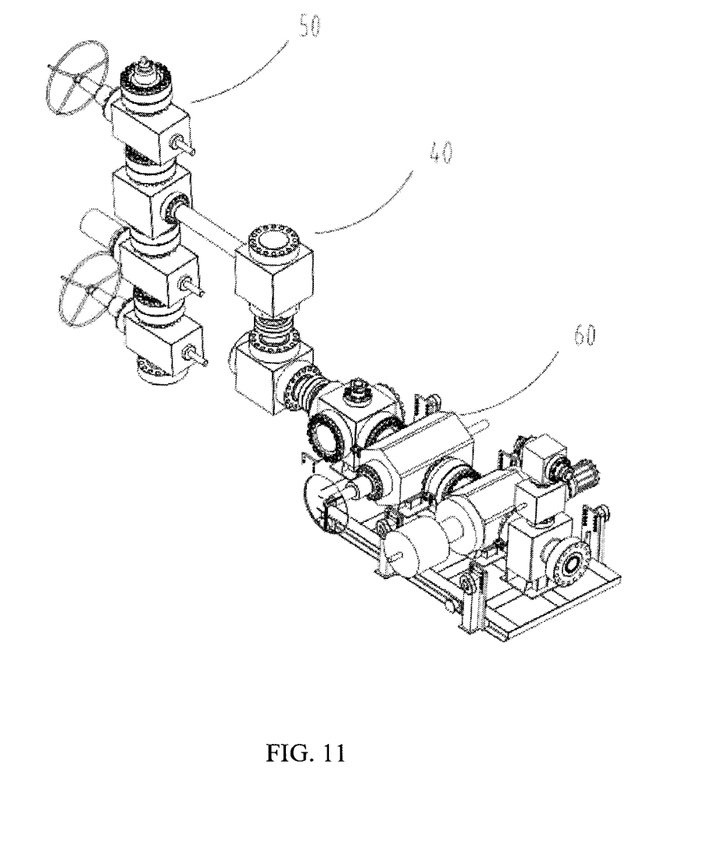
FIG. 11 is a first application of the hard pipe connecting device of the present invention.
Figure 12:
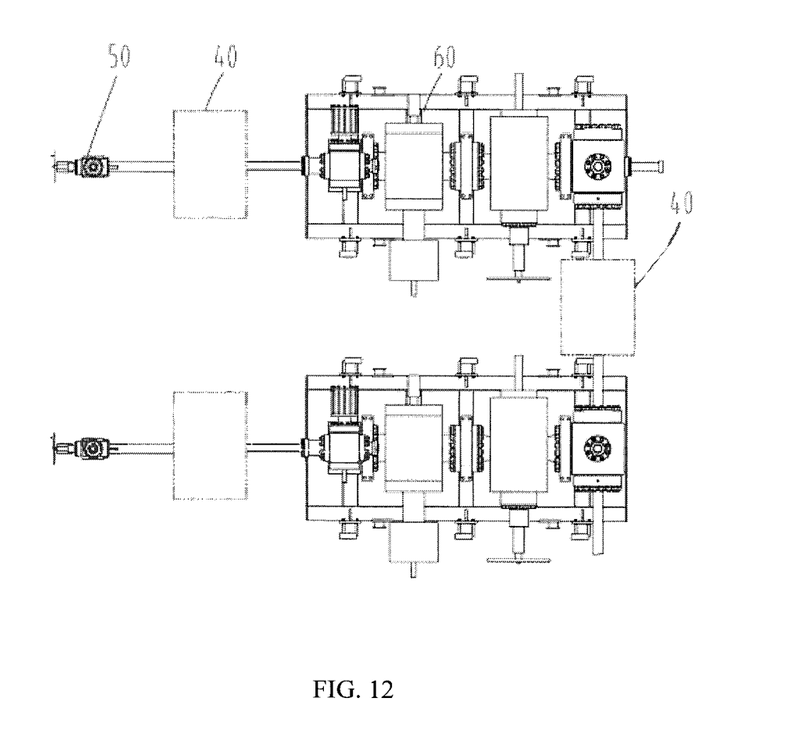
FIG. 12 shows a second application of the hard pipe connecting device of the present invention.

As shown in FIGS. 11-12, a manifold system comprises at least one fracturing tree 50 and at least one shunt manifold skid 60. Each of the fracturing trees 50 is communicated with the shunt manifold skid 60 through at least one hard pipe connecting device 40 as described above, and adjacent shunt manifold skids 60 are communicated through the hard pipe connecting device 40.

A manifold system of the embodiment adopts the hard tube connecting device 40 to connect the shunt manifold skid 60 and the fracturing tree 50, to accomplish convenient and fast, reliable and stable connection between the fracturing tree 50 and the shunt manifold skid 60, and/or between adjacent shunt manifold skid 60 with less quantity of pipe joints, and simultaneously, make the stable connection between fracturing tree 50 and the shunt manifold skid 60 not affected by location deviation, and further improve the adaptability of manifold system to different environments.

Example 6

Figure 13:
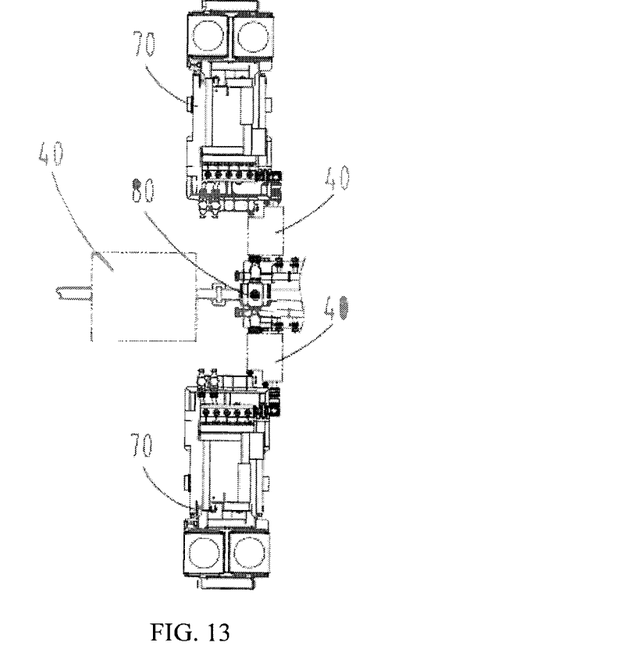
FIG. 13 shows a third application of the hard pipe connecting device of the present invention.
Figure 14:
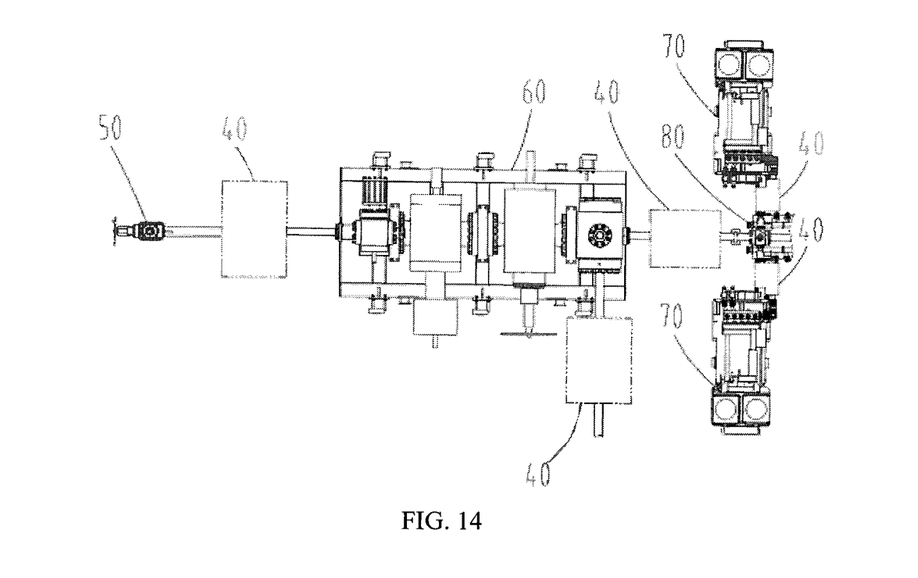
FIG. 14 shows a fourth application of the hard pipe connecting device of the present invention.

As shown in FIGS. 13-14, a manifold system comprises at least one fracturing device 70 and at least one high-low pressure manifold skid 80. The fracturing device 70 and the high-low pressure manifold skid 80 are communicated through at least one hard pipe connecting device 40 as described in the above embodiments, and the fracturing device 70 is a fracturing pump in this embodiment.

A manifold system of this embodiment, not only adopts the hard tube connecting device 40 to connect the fracturing tree 50 and the shunt manifold skid 60, the adjacent shunt manifold skids 60, and the fracturing device 70 and the high-low pressure manifold skid 80, to accomplish convenient and fast, reliable and stable connection through less quantity's pipe joints between the fracturing device 70 and the high-low pressure manifold skid 80, and simultaneously, make the stable connection between the fracturing device 70 and the high-low pressure manifold skid 80 not influenced by location deviation, and improve the adaptability of manifold system to different environment.

Specifically, as shown in FIG. 14, the shunt manifold skid 60 and the high-low pressure manifold skid 80 are also in communication via the hard pipe connecting device 40.

Specifically, the hard pipe connecting device 40 of the present embodiment can be adapted to a scenario related to complex fluid pipeline transportation, such as fracturing fluid transportation, diversion, confluence, slurry transportation, etc., in the oil drilling industry, and particularly can be adapted to fast and stable connection between two to-be-connected surfaces with a spatial azimuth deviation and a spatial distance difference, and can reduce vibration of the manifold system and improve stability of complex fluid high-pressure transportation by matching between the connection joints of the hard pipe connecting device 40.

The above description is only for the purpose of illustrating the preferred embodiments of the present invention and is not to be construed as limiting the invention, and any modifications, equivalents and improvements made within the spirit and principle of the present invention are intended to be included within the scope of the present invention.

What is claimed is:

1. A hard pipe connecting device, comprising at least one non-concentric connecting pipe joint (1), at least one universal connecting pipe joint (2), and a rotary seal (3), wherein:
   the non-concentric connecting pipe joint (1) comprises a pipe body (11) and two first flanges (12) at opposite ends of the pipe body (11), the two first flanges (12) are parallel to each other, and the two first flanges (12) have respective axes with a distance difference h>0;
   the universal connecting pipe joint (2) comprises a pipe joint main body (21) and second flanges (22) at respective first and second ends of the pipe joint main body (21), the second flanges (22) have respective end surfaces with planes that form an included angle M<90°, and the non-concentric connecting pipe joint (1) and the universal connecting pipe joint (2) form a butt joint or a pipeline; and
   the rotary seal (3) is between one of the first flanges (12) and the pipe body (11) and/or between one of the second flanges (22) and the pipe joint main body (21), the rotary seal (3) comprises a supplementary core (31) and a plurality of steel balls (32); the supplementary core (31) has a bearing end surface with a rear side; the steel balls (32) are at the rear side of the bearing end surface of the supplementary core (31); the pipe body (11) and/or the pipe joint main body (21) are configured with mounting grooves (4) matching the steel balls (32); the supplementary core (31) comprises bending sections (311); the pipe body (11) and/or the pipe joint main body (21) are configured with notches (5) matching the bending sections (311), and the bending sections (311) extend into the notches (5).

2. A hard pipe connecting device according to claim 1, wherein the pipe joint main body (21) has an axis, and the end surface of one of the second flanges (22) is perpendicular to the axis of the pipe joint main body (21).

3. A hard pipe connecting device according to claim 2, wherein the pipe body (11), the pipe joint main body (21), the first flange (12) and the second flange (22) are each configured with at least one tool hole (8).

4. A hard pipe connecting device according to claim 3, wherein the pipe body (11) includes an outer wall with a rib, and the at least one first tool hole (8) in on the rib.

5. A hard pipe connecting device according to claim 1, further comprising a mounting groove (4) and a limiting part (7), wherein each first flange (12) and/or second flange (22) is configured with a mounting hole (6) for mounting the steel balls (32), the mounting hole (6) is in communication with the mounting groove (4), and the limiting part (7) is in the mounting hole (6).

6. A hard pipe connecting device according to claim 1, wherein one of the first flanges (12) has an end surface, the end surface of the one first flange (12) and the end surface of one of the second flanges (22) are respectively configured with a sealing groove (9), and the sealing groove (9) is configured to enclose a sealing ring (10).

7. A hard pipe connecting device according to claim 1, wherein the hard pipe connecting device (40) further comprises at least one angle pipe joint (20) and/or at least one straight pipe joint (30).

8. A hard pipe connecting device according to claim 7, wherein the straight pipe joint (30) comprises a straight pipe (301) and third flanges (302) at opposite ends of the straight pipe (301), and the rotary seal (3) is between the third flanges (302) and the straight pipe (301).

9. A hard pipe connecting device according to claim 1, comprising two or more of the non-concentric connecting pipe joints (1), sequentially connected by a butt joint to form a split-joint surface.

10. A manifold system, comprising:
    at least one fracturing tree (50), and
    at least one shunt manifold skid (60), wherein
       each of the at least one fracturing tree (50) is in communication with the at least one shunt manifold skid (60) by at least one hard pipe connecting device (40) comprising at least one non-concentric connecting pipe joint (1), wherein the non-concentric connecting pipe joint (1) comprises a pipe body (11) and two first flanges (12) at opposite ends of the pipe body (11), the two first flanges (12) are parallel to each other, and the two first flanges (12) have respective axes with a distance difference h>0, and
       when the at least one shunt manifold skid (60) includes a plurality of adjacent shunt manifold skids (60), the adjacent shunt manifold skids (60) are in communication with each other by the at least one hard pipe connecting device (40).

11. The manifold system according to claim 10, further comprising
    at least one fracturing device (70); and
    at least one high-low pressure manifold skid (80),
    the shunt manifold skid (60) and the high-low pressure manifold skid (80) being in communication by at least one further hard pipe connecting device (40).

12. The manifold system according to claim 11, wherein the pipe joint main body (21) has an axis, and the end surface of one of the second flanges (22) is perpendicular to the axis of the pipe joint main body (21).

13. The manifold system according to claim 11, wherein the at least one hard pipe connecting device (40) further comprises a rotary seal (3) between one of the first flanges (12) and the pipe body (11) and/or between one of the second flanges (22) and the pipe joint main body (21).

14. The manifold system according to claim 13, wherein the rotary seal (3) comprises a supplementary core (31) and a plurality of steel balls (32); the supplementary core (31) has a bearing end surface with a rear side; the steel balls (32) are at the rear side of the bearing end surface of the supplementary core (31); the pipe body (11) and/or the pipe joint main body (21) are configured with mounting grooves (4) matching the steel balls (32); the supplementary core (31) comprises bending sections (311); the pipe body (11) and/or the pipe joint main body (21) are configured with notches (5) matching the bending sections (311), and the bending sections (311) extend into the notches (5).

15. The manifold system according to claim 10, wherein the at least one hard pipe connecting device (40) further comprises at least one universal connecting pipe joint (2), wherein the universal connecting pipe joint (2) comprises a pipe joint main body (21) and second flanges (22) at respective first and second ends of the pipe joint main body (21), the second flanges (22) have respective end surfaces with planes that form an included angle M<90°, and the non-concentric connecting pipe joint (1) and the universal connecting pipe joint (2) form a butt joint or a pipeline.

16. The manifold system according to claim 15, further comprising:
    at least one fracturing device (70), and
    at least one high-low pressure manifold skid (80),
    the shunt manifold skid (60) and the high-low pressure manifold skid (80) being in communication by at least one further hard pipe connecting device (40).

17. A manifold system, comprising:
    a fracturing device (70); and
    at least one high-low pressure manifold skid (80),
    the fracturing device (70) and the high-low pressure manifold skid (80) being in communication with each other by at least one hard pipe connecting device (40) comprising at least one non-concentric connecting pipe joint (1), wherein the non-concentric connecting pipe joint (1) comprises a pipe body (11) and two first flanges (12) at opposite ends of the pipe body (11), the two first flanges (12) are parallel to each other, and the two first flanges (12) have respective axes with a distance difference h>0.

18. The manifold system according to claim 17, wherein:
    the at least one hard pipe connecting device (40) further comprises at least one universal connecting pipe joint (2), wherein the universal connecting pipe joint (2) comprises a pipe joint main body (21) and second flanges (22) at respective first and second ends of the pipe joint main body (21), the second flanges (22) have respective end surfaces with planes that form an included angle M<90°, and the non-concentric connecting pipe joint (1) and the universal connecting pipe joint (2) form a butt joint or a pipeline.

19. The manifold system according to claim 18, wherein the at least one hard pipe connecting device (40) further comprises a rotary seal (3) between one of the first flanges (12) and the pipe body (11) and/or between one of the second flanges (22) and the pipe joint main body (21), the rotary seal (3) comprises a supplementary core (31) and a plurality of steel balls (32); the supplementary core (31) has a bearing end surface with a rear side; the steel balls (32) are at the rear side of the bearing end surface of the supplementary core (31); the pipe body (11) and/or the pipe joint main body (21) are configured with mounting grooves (4) matching the steel balls (32); the supplementary core (31) comprises bending sections (311); the pipe body (11) and/or the pipe joint main body (21) are configured with notches (5) matching the bending sections (311), and the bending sections (311) extend into the notches (5).

20. The manifold system according to claim 19, wherein the pipe joint main body (21) has an axis, and the end surface of one of the second flanges (22) is perpendicular to the axis of the pipe joint main body (21).

* * * * *